Patented May 8, 1945

2,375,348

UNITED STATES PATENT OFFICE 2,375,348

WATER REPELLENT COMPOSITION AND METHOD OF UTILIZING SAME

Jesse J. Cohen, New York, N. Y., assignor of fifteen per cent to Joseph Heller, New York, N. Y.

No Drawing. Application November 14, 1940, Serial No. 365,694

8 Claims. (Cl. 260—21)

My present invention relates to a composition for and a method of, rendering fibrous or porous materials durably water repellent. By fibrous or porous materials is meant such materials as textiles, and the like.

In the past water repellent emulsions suitable for application to fibrous or porous materials have been essentially emulsions of paraffin, or similar acting waxes, and aluminum salts or combination emulsion-solutions, the emulsified portion being the wax and the ingredients in solution consisting of aluminum salts alone or combined with water-soluble thermo-setting resins. All such prior emulsions have been characterized by poor resistance to removal by exposure to the elements, or, as in the case of treated textiles, by poor resistance to wet washing or dry cleaning, and the water repellent properties have been largely lost after a relatively short exposure to the elements or after a single washing or dry cleaning.

The present invention provides a composition comprising essentially a water emulsion of a drying oil, an aluminum, zinc or magnesium salt of a saturated organic acid, and a non-oxidizing wax, with or without a synthetic resin; or an emulsion of a drying oil, an aluminum, zinc or magnesium salt of a saturated organic acid, and a non-oxidizing wax in an aqueous solution or dispersion of a water-soluble, or dispersible, synthetic resin. Better impregnation of the porous or fibrous material is obtained with the present composition than is possible with waxy materials emulsified directly in water. Further, the present compositions are so prepared that each ingredient contributes to the water repellency of the final finish, and the latter is characterized by its resistance to removal by exposure to the elements and, as in the case of textiles, by its excellent resistance to wet washing or dry cleaning.

Finishing with previous water repellent emulsions was accomplished by immersion of the textile material in the emulsion, often with subsequent removal of excess emulsion by mechanical means. The latter comprised, for example, squeezing through rollers, prior to drying at relatively high temperatures. This is common practice in textile finishing.

Finishing with the present emulsion is accomplished in a similar manner to give improved results since all or most ingredients of the finish are already homogeneously pre-mixed in the form of droplets. The latter, because of their nature, readily and rapidly penetrate the fibrous or porous textile material thereby providing greater and more uniform impregnation than is possible with previous emulsions. After-treatment with heat effects a curing and polymerization of the drying oil and resin which serve to bind the wax and aluminum salt to the processed textile material. This provides a substantially insoluble composition affixed to the porous or fibrous textile material in such a manner as to show a marked resistance to removal. The interstices or pores of the material are left open so as to permit the passage of air; the term "water repellent" used herein designates such a treated material, in contrast to the term "waterproofing" which signifies a treatment wherein the pores of the material are closed. At the same time, the wax acts as a plasticizer for the resinous materials thereby increasing the efficacy of the composition in the finishing of certain pliable types of materials, such as textiles.

It is pointed out that fabrics treated with this present composition possess the following desirable properties. Fabrics so treated are rendered durably water repellent, and soil resistant to perspiration and urine. The tensile strength of rayon fibres is increased by means of this treatment. The latter further prevents soiling due to creasing, and sets cotton and rayon fibres thereby stabilizing the residual shrinkage due to washing.

It may, therefore, be stated that it is an object of the present invention to provide a concentrated water repellent mixture wherein one or more water repelling agents in an oily medium are intimately mixed with a water-soluble synthetic resin in the presence of a small quantity of alkali, and the said mixture being capable of spontaneous emulsification in an ammoniacal solution.

Another object of the present invention is to provide a water repellent compound in emulsion form wherein one or more water repelling agents in an oily phase are dispersed throughout an aqueous solution, or dispersion, of a synthetic resin.

Another object of my invention is to provide a water repellent compound in emulsion form wherein one or more water repelling agents and a synthetic resin in an oily phase are dispersed in a watery phase by means of the emulsifying action of a thermo-labile soap.

A further object of the present invention is to provide a method of rendering fibrous or porous materials durably water repellent by means of an emulsion containing one or more water repelling agents, including a drying oil, in the oily phase, and a thermo-setting synthetic resin in either the oil or watery phase.

A further object of the invention is to provide a durable and economical water repellent finish for porous or fibrous materials by means of a composition including a drying oil, an aluminum compound, a non-oxidizing wax and a heat-hardenable synthetic resin.

The following are examples of compositions through the use of which the aforesaid objects may be attained by those skilled in the art.

EXAMPLE I

| | Parts |
|---|---|
| Japan wax | 8 |
| Aluminum stearate (di-basic) | 4 |
| China-wood oil | 8 |
| Stoddard solvent | 33 |
| Water-soluble, A-stage ureaformaldehyde resin | 46 |
| Ammonium hydroxide (28%) | 1 |

In preparing the above composition, in which the parts by weight are given, the aluminum stearate, dissolved in half the Stoddard solvent, is added to the melted Japan wax with agitation. The mixture is brought to a temperature of 65° C. The resulting gel is cooled to 35° C. At this point first the ammonium hydroxide, then the China-wood oil in the remaining solvent, and finally the resin are added with stirring. Subsequent milling of the mixture results in a smooth paste which is readily emulsifiable by simple agitation in 1% ammoniacal solution.

By "Stoddard solvent" is meant that petroleum fraction boiling within the approximate range of 140° F. to 195° F. In place of Stoddard solvent may be used any low boiling petroleum solvent. In place of Japan wax may be used any non-oxidizable oils, natural or synthetic waxes having a relatively high acid number. In general, there may be employed in place of the Japan wax a nonoxidizing material abundant in saturated fatty acids which will combine with a volatile base to form a thermo-labile soap capable of acting as a suitable emulsifying agent for the entire composition of Example I. The thermo-labile soap will break down and volatilize during the heating, or curing, step after treatment of a material with the composition. In place of the water-soluble, intermediate stage ureaformaldehyde resin there may be substituted any water-soluble intermediate product of a thermo-setting resin, such as the water-soluble intermediate products of the melamine resins. In place of ammonium hydroxide there may be used other volatile bases such as aliphatic, aromatic or heterocyclic amines.

In place of aluminum stearate there may be used the aluminum, zinc or magnesium salt of any saturated organic acid, preferably one of the fatty type. In place of China-wood oil, which is preferably deodorized by blowing steam through it, there may be employed any drying oil such as candlenut oil, linseed oil, perilla oil, Japanese wood oil, soya bean oil, and the like. It is, also, pointed out that oils converted into drying oils by chemical means may be utilized, and such oils may include dehydrated and dehydrogenated fatty oils. In the case of slow-acting drying oils, very small percentages of metallic catalysts, such as the napthenates of lead, cobalt, zinc or manganese, may be added to expedite drying. The addition of readily-emulsifiable hydrophilic materials, such as a mixture of the isopropyl esters of palmitic and myristic acids, provides greater stability of the diluted emulsion since such materials function as dispersion aids.

EXAMPLE II

Part A

| | Parts |
|---|---|
| Japan wax | 6 |
| Aluminum stearate (di-basic) | 4 |
| China-wood oil | 8 |
| Stoddard solvent | 15 |
| Butanol | 40 |
| Water-insoluble B-stage ureaformaldehyde resin | 25 |
| Isopropyl esters of palmitic and myristic acids (mixture) | 2 |
| | 100 |

Part B

| | Parts |
|---|---|
| Ammonium hydroxide (28%) | 2 |
| Water | 198 |
| | 200 |

Part A is stirred into part B to form a smooth base emulsion which may be used directly, or the emulsion may be diluted to the desired strength.

EXAMPLE III

| | Parts |
|---|---|
| Japan wax | 8 |
| Aluminum stearate (di-basic) | 8 |
| China-wood oil | 16 |
| Stoddard solvent | 66 |
| Ammonium hydroxide (28%) | 1 |

Emulsify 1:2 with a 1% solution of ammonium hydroxide (28%) water.

EXAMPLE IV

| | Parts |
|---|---|
| Japan wax | 8 |
| Aluminum stearate (di-basic) | 4 |
| China-wood oil | 8 |
| Stoddard solvent | 33 |
| Water-soluble melamine resin (50% in water) | 46 |
| Ammonium hydroxide (28%) | 1 |

The melamine resin is solubilized by heating to 90° C. in water with agitation. The above composition is then prepared according to the directions given for Example I, and may be spontaneously emulsified by simple agitation in a 1% ammoniacal solution.

A specific example of a finishing method with a composition of the invention follows:

A sample of 8 oz. bleached cotton duck is passed through a padder containing one part of the composition given as Example I emulsified by simple agitation in 2 parts of a 1% NH4OH (28%) solution. After padding, the fabric is partially dried on a tender-frame, or drying cylinder, and is then passed into a loop dryer which has provisions for air circulation, and which is preferably maintained at a temperature between 290° and 310° F. Passage of the fabric through the dryer should preferably require from 3 to 6 minutes during which time occurs adequate oxidation and polymerization of the China-wood oil, and there also takes place condensation and polymerization of the ureaformaldehyde resin. The dried fabric is rinsed in warm water to remove any undesirable impurities, and is dried once again on the tender-frame, after which it is hot-calendered. The rinsing removes any free soap, as well. The water repellency of the finish thus provided remains substantially unimpaired after repeated launderings or dry cleanings. Furthermore, the coated fabric is odorless. That is to say, the treated fabric while capable of shedding water permits the passage of air through its pores.

Having thus described the invention, what I claim is:

1. A water repelling composition comprising a water emulsion resulting from the mixture of Japan wax, aluminum stearate, uncooked and unpolymerized China-wood oil, water-soluble A-stage ureaformaldehyde resin, ammonium hydroxide and a hydrocarbon solvent and said ammoniacal base reacting with free fatty acids in said mixture to form a thermo-labile soap acting as the active emulsifier for the entire mixture.

2. A water repelling composition comprising a water emulsion resulting from the mixture of a wax abundant in free fatty acids, dibasic, aluminum stearate, unpolymerized China-wood oil, ammonium hydroxide and a hydrocarbon solvent, said ammoniacal base reacting with free fatty acids in said mixture to form a thermo-labile soap acting as the emulsifier for the entire mixture.

3. A process for rendering a textile material durably water repellent which includes treating the material with a water emulsion resulting from the mixture of a drying oil in uncooked state, a non-oxidizing wax having an abundance of free fatty acids, a water-insoluble metal salt of a saturated organic acid, ammonium hydroxide in sufficient amount to react with free fatty acids to provide a thermo-labile soap emulsifier for the entire mixture, a solvent and a thermo-setting resin and drying at a temperature between 290° and 310° F. in a current of air for a minimum of 3 minutes to effect condensation and polymerization of the resin and concurrent oxidation and polymerization of the drying oil.

4. A water repellent composition comprising an emulsion resulting from the mixture of a non-oxidizable wax, a metallic salt of a saturated organic acid, an uncooked and unpolymerized drying oil, "A" stage ureaformaldehyde resin, ammonia and a hydrocarbon solvent, said ammonia being present in sufficient quantity to react with free fatty acids present in the mixture to form a thermo-labile soap emulsifier.

5. A water repellent composition comprising a drying oil in uncooked and unpolymerized state emulsified in an aqueous solution containing a non-oxidizing wax, a water-insoluble metal soap of a saturated fatty acid and a thermo-labile soap emulsifier.

6. A water repellent composition, adapted for rapid and uniform impregnation of fabrics, comprising a water emulsion resulting from the mixture of an uncooked and unpolymerized drying oil, a water insoluble metal soap of a saturated organic acid, a non-oxidizing wax abundant in saturated fatty acids, a sufficient quantity of a volatile base adapted to combine with said fatty acids to form a thermo-labile soap acting as the emulsifying agent, said wax acting as a plasticizer and the quantity of solids present in the composition being insufficient to close up the pores of the treated water repellent fabric.

7. A water repellent composition, adapted for impregnation of fabrics, comprising a water emulsion containing China-wood oil in uncooked and unpolymerized state, dibasic aluminum stearate functioning as a water-insoluble metal soap, non-oxidizing wax abundant in saturated fatty acids, the wax functioning as a plasticizer, ammonium hydroxide in sufficient quantity to combine with fatty acids present in said composition to form thermo-labile ammonia soap which functions to emulsify the composition, and said thermo-labile soap being adapted to break down and volatilize during heating after treatment of said fabric with the composition, and there being a sufficiently low amount of solids present in the composition to insure the passage of air through the pores of the resulting water repellent fabric.

8. A concentrated water repellent aqueous emulsion, in which all ingredients are pre-mixed in the form of homogeneous droplets, comprising an uncooked and unpolymerized drying oil, a water-insoluble metal soap of a saturated fatty acid, a non-oxidizing plasticizer wax abundant in saturated fatty acids, a hydrocarbon solvent, and a sufficient large amount of a volatile base to combine with all free fatty acids to form a thermo-volatile soap capable of acting as a suitable emulsifying agent for the entire mixture of ingredients.

JESSE J. COHEN.